(12) United States Patent
Carr et al.

(10) Patent No.: US 8,379,025 B1
(45) Date of Patent: Feb. 19, 2013

(54) METHODS AND APPARATUS FOR RENDERING VECTOR ART ON GRAPHICS HARDWARE

(75) Inventors: Nathan A. Carr, San Jose, CA (US); Gavin S. P. Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 845 days.

(21) Appl. No.: 12/549,765

(22) Filed: Aug. 28, 2009

(51) Int. Cl.
*G06T 15/50* (2011.01)
(52) U.S. Cl. ......................... 345/426; 345/419
(58) Field of Classification Search .................... 345/426
See application file for complete search history.

(56) References Cited

U.S. PATENT DOCUMENTS

2005/0017971 A1* 1/2005 Ard ............................... 345/423
2007/0097123 A1    5/2007 Loop

OTHER PUBLICATIONS

Kokojima, Y., Sugita, K., Saito, T., and Takemoto, T. 2006, "Resolution independent rendering of deformable vector objects using graphics hardware," in SIGGRAPH '06: ACM SIG-GRAPH 2006 Sketches, ACM, New York, NY, USA, 118.
Loop, C., and Blinn, J. 2005, "Resolution independent curve rendering using programmable graphics hardware," in SIG-GRAPH '05: ACM SIGGRAPH 2005 Papers, ACM, New York, NY, USA, 1000-1009.
Parilov, E., and Zorin, D. 2008, "Real-time rendering of textures with feature curves," ACM Transactions on Graphics, vol. 27, No. 1, pp. 1-15 (Mar. 2008).
Qin, Z., McCool, M. D., and Kaplan, C. 2008, "Precise vector textures for real-time 3d rendering," in I3D '08:Proceedings of the 2008 symposium on Interactive 3D graphics and games, ACM, New York, NY, USA, 199-206.
Rueda, A. J., Ruiz De Miras, J., and Feito, F. R. 2008, "Technical section: Gpu-based rendering of curved polygons using simplicial coverings," Comput. Graph. 32, 5, 581-588.
Sederberg, T. W. 1983, "Implicit and parametric curves and surfaces for computer aided geometric design," PhD thesis, West Lafayette, IN, USA.
Sen, P. 2004, "Silhouette maps for improved texture magnification," In HWWS '04: Proceedings of the ACM SIG-GRAPH/Eurographics conference on Graphics hardware, ACM, New York, NY, USA, 65-73.
Taubin, G. 1994, "Distance approximations for rasterizing implicit curves," ACM Trans. Graph. 13, 1, 3-42.
Turkowski, K. 1982, "Anti-aliasing through the use of coordinate transformations," ACM Trans. Graph. 1, 3, 215-234.

* cited by examiner

*Primary Examiner* — Michelle L Sams
(74) *Attorney, Agent, or Firm* — Wolfe-SBMC

(57) ABSTRACT

Methods and apparatus for ray-casting 2D animated vector art on graphics hardware. Embodiments maintain curves in their analytic form when transmitted to the GPU. On the CPU, the curves in the vector art may be subdivided into a plurality of monotonic curve segments. A plurality of intervals may be generated from the curve segments. Further subdivision may be applied on the CPU to any interval that includes more than n curves, where n is the maximum number of curves that can be processed in parallel in the pixel shader. On the GPU, the pixels are evaluated to determine whether each pixel is inside or outside of the curve network. The technique used in the GPU may be based on a point-in-polygon algorithm that casts rays from points under test and counts the number of curve crossings before the rays exit the shape using a modified implicit formula.

20 Claims, 10 Drawing Sheets b0 (C4,C3)
b1 (C4,C2)
b2 (C0,C2)
b3 (C0,C8,C7)
b4 (C12,C11,C2)
b5 (C0,C5,C6)
b6 (C9,C10,C2)
b7 (C0,C2)
b8 (C0,C1)

METHODS AND APPARATUS FOR RENDERING VECTOR ART ON GRAPHICS HARDWARE

BACKGROUND

Description of the Related Art

Conventionally, web based 2D graphics engines such as Adobe® Flash® technology employ two-dimensional (2D) bounded Bézier shapes as their primitive of choice. 2D bounded Bézier shapes provide a compact representation, and are efficient for data transmission. Conventional three-dimensional (3D) graphics APIs (application programming interfaces) and GPUs (graphics processing units), however, are designed around efficiently rendering triangles. This mismatch poses significant challenges when trying to use graphics hardware to render Bézier bounded content, particularly animated content and particularly when rendering on less powerful devices.

One approach to offloading rendering of Bézier bounded content to graphics hardware is to run 2D planar mapping on the content. The content in this form can then be triangulated and sent to the GPU for rendering. However, triangulation can be expensive on the CPU, and this approach only produces piece-wise linear approximations to the true curved Bézier segments.

Loop and Blinn presented a resolution independent way of rendering Bézier bounded shapes on the GPU (Loop, C., and Blinn, J., 2005: Resolution independent curve rendering using programmable graphics hardware, *SIGGRAPH '05: ACM SIGGRAPH* 2005 *Papers*, ACM, New York, N.Y., USA, 1000-1009). This technique relies on converting curve segments into their implicit form and evaluating inside-outside tests in the pixel shader. Loop and Blinn's method requires significant preprocessing to decompose space into triangular regions in which only a single curve is needed in performing the inside-outside test. This preprocessing phase requires Delaunay triangulation and subdivision, which can be time-consuming, particularly for animated content.

Kokjima et al. proposed a combination of inside-outside testing using a stencil buffer and the work by Loop and Blinn (Kokojima, Y., Sugita, K., Saito, T., and Takemoto, T., 2006: Resolution independent rendering of deformable vector objects using graphics hardware, *SIGGRAPH '06: ACM SIGGRAPH* 2006 *Sketches*, ACM, New York, N.Y., USA, 118). However, processing complex shapes using stencil buffer logic can result in a significant amount of overdraw. On low-end GPU devices with minimal frame buffer bandwidth, the cost of resolving such shapes with stenciling may be prohibitive.

Graphics Hardware Technology

Graphics hardware for use in various computer systems is commercially available from vendors such as NVIDIA Corporation, ATI Technologies (AMD), and others. An example of graphics hardware, which may be referred to as a graphics card or graphics processing unit (GPU), may implement one or more application programmer interfaces (APIs) that permit programmers to invoke the graphics functionality of the GPU(s). Geometry and texturing information may be sent to the GPU for appropriate graphics processing on the hardware.

In the past, graphics cards were typically implemented to provide a fixed function pipeline (FFP). These graphics cards implemented a few fixed graphics functions and provided little if any programmatic control beyond selecting a function. More recently, graphics hardware that provides much more control by the programmer has been introduced. GPUs and their associated APIs, for example, now typically provide programmable shader functionality. Vertex shaders are programmable to operate on vertex data, while pixel shaders are programmable to operate on pixel data. Using the APIs, appropriate shader code may be developed by the programmer, loaded into the GPU, and plugged directly into the graphics pipeline.

SUMMARY

Various embodiments of methods and apparatus for raycasting 2D animated vector art on graphics hardware are described. Embodiments may provide methods for rendering quadratic Bézier-bounded two-dimensional (2D) vector art, such as Adobe®Flash® technology or SVG (Scalable Vector Graphics) technology vector content, using graphics hardware such as a graphics processing unit (GPU). Embodiments provide methods for rendering vector art on graphics hardware without expensive triangulation. Embodiments of vector art rendering methods as described herein may reduce the CPU overhead required for processing geometry, and place the primary burden of rendering the content onto the graphics hardware. Embodiments may provide methods that leverage graphics hardware to efficiently render quadratic Bézier content directly, thus eliminated the need for expensive CPU-side planar mapping and triangulation. Embodiments of the vector art processing methods may be resolution independent and affine invariant, may provide high performance when compared to conventional methods, and may allow the processing load to be redistributed between the GPU and CPU to accommodate different hardware configurations. Embodiments of methods for rendering vector art using graphics hardware may be implemented in or as a vector art rendering module. The vector art rendering module includes both CPU-side and GPU-side components or submodules.

Embodiments of the vector art rendering module may maintain curves in their analytic form when transmitted to the GPU. On the GPU, the curve networks may be evaluated to determine whether the pixel is inside or outside of the curve network. In some embodiments, the technique used in the GPU in the discard operation may be based on a point-in-polygon algorithm that casts rays from points under test and counts the number of crossings before the rays exit the shape using a modified implicit formula.

For complex artwork with a large numbers of curves, the ray casting operation described above may result in the need to test against a virtually unbounded set of curves in the pixel shader. Embodiments of the vector art rendering module may thus implement a method to bound the number of curves needed for such an inside-outside test, thus avoiding looping and branching in the pixel shader component on the GPU. The method for bounding the number of curves needed for the inside-outside test may be performed on the CPU side. However, this method is less CPU-intensive than the triangulation methods used in conventional vector art rendering techniques such as the Loop-Blinn technique.

In embodiments, an example of Bézier-bounded 2D vector art to be rendered may be obtained. In a CPU-side component of the vector art rendering module, the curves in the vector art may be subdivided into a plurality of monotonic curve segments. In some embodiments, the curves in a curve network of an example Bézier-bounded 2D vector art are subdivided into a plurality of y-monotone curve segments. The curve segments are monotonic in y; that is, each curve segment has only a single crossing horizontally, in x. A plurality of rectangular regions, which may be referred to as rectangles, may be generated from the curve segments. In some embodiments, the start and end events of the curve segments are sorted in y to form a plurality of intervals. Each interval may be represented as a rectangle that bounds the portions of the curve segments that are in or cross through the interval.

GPUs are generally able to perform at least some parallel processing. For example, pixel shaders may be able to process R, G, B and Alpha channels in parallel. Embodiments may take advantage of the parallel processing capabilities of GPUs to process multiple curves in parallel in the pixel shader. After generating the intervals on the CPU, further subdivision may be applied on the CPU to any interval that includes more than n curves, where n is the maximum number of curves that can be processed in parallel in the pixel shader. In some embodiments, n=4. In some embodiments, this subdivision may be applied in x.

After the above method to bound the number of curves is performed on the CPU, GPU rendering may be performed on the resultant rectangles. The analytic curve data representing the set of monotonic curves may be transferred to the graphics hardware, for example as an array of curve control points. For each rectangle, data representing the bounds of the rectangle and referencing the curve segments included in the rectangle is sent to the graphics hardware. On the graphics hardware, when processing a rectangle, a vertex shader coalesces the respective curves to produce the implicit forms of the respective curves for the rectangle and forwards the implicit forms of the curves to the pixel shader. For each rectangle, the pixel shader applies an inside-outside test using ray casting at each pixel within the rectangle and the implicit forms of the curves within the rectangle to discard fragments that lie outside of the bounded curve network, and appropriately renders the pixels that lie inside of the bounded curve network. The pixel shader may use a modified form of the implicit formula ($\hat{h}(x, y) = r_0 + |r_1|r_1$) in the inside-outside testing. This processing may be done on the pixel shader in parallel, with up to n curves being processed in parallel. Each rectangle effectively clips the bounds of the inside-outside testing on that rectangle so that points above or below the curves are not unnecessarily tested against the curves within the rectangle.

Figure 1:
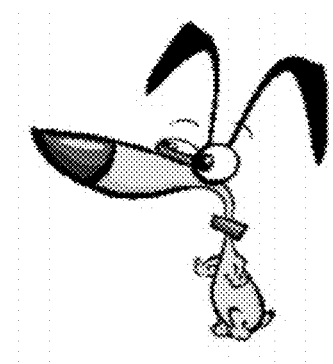
FIG. 1 shows an example of Bézier bounded 2D vector art that may be rendered using embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for raycasting 2D animated vector art on graphics hardware are described. Embodiments may provide methods for rendering quadratic Bézier-bounded two-dimensional (2D) vector art, such as Adobe® Flash® technology or SVG (Scalable Vector Graphics) technology vector content, using graphics hardware such as a graphics processing unit (GPU). In this document, "GPU" and "graphics hardware" may be used interchangeably. FIG. 1 shows an example of Bézier bounded 2D vector art that may be rendered using embodiments. Bézier bounded shapes, for example as represented in Adobe® Flash® technology and SVG technology, may have complex networks of curves, which may be both concave and self intersecting.

Conventional 3D graphics APIs and GPUs are designed to efficiently render triangles. Thus, conventional methods of rendering vector art using graphics hardware have relied upon CPU-side triangulation to prepare the art for rendering by the graphics hardware. However, triangulating content at runtime on a CPU is expensive, and for animated vector art, where triangulation may need to be performed at each "frame", the CPU cost may be prohibitive, particularly on systems with relatively low-power CPUs. Embodiments provide methods for rendering vector art on graphics hardware without expensive triangulation. Embodiments of vector art rendering methods as described herein may reduce the CPU overhead required for processing geometry, and place the primary burden of rendering the content onto the graphics hardware. Embodiments may provide methods that leverage graphics hardware to efficiently render quadratic Bézier content directly, thus eliminated the need for expensive CPU-side planar mapping and triangulation. Embodiments of the vector art processing method described herein may be resolution independent and affine invariant. When a change is made to the vector artwork, if the content does not change, for example if the art is only being rotated, scaled, or translated, reprocessing is not required. Embodiments may provide high performance when compared to conventional methods, and may allow the processing load to be redistributed between the GPU and CPU to accommodate different hardware configurations.

Figure 9:
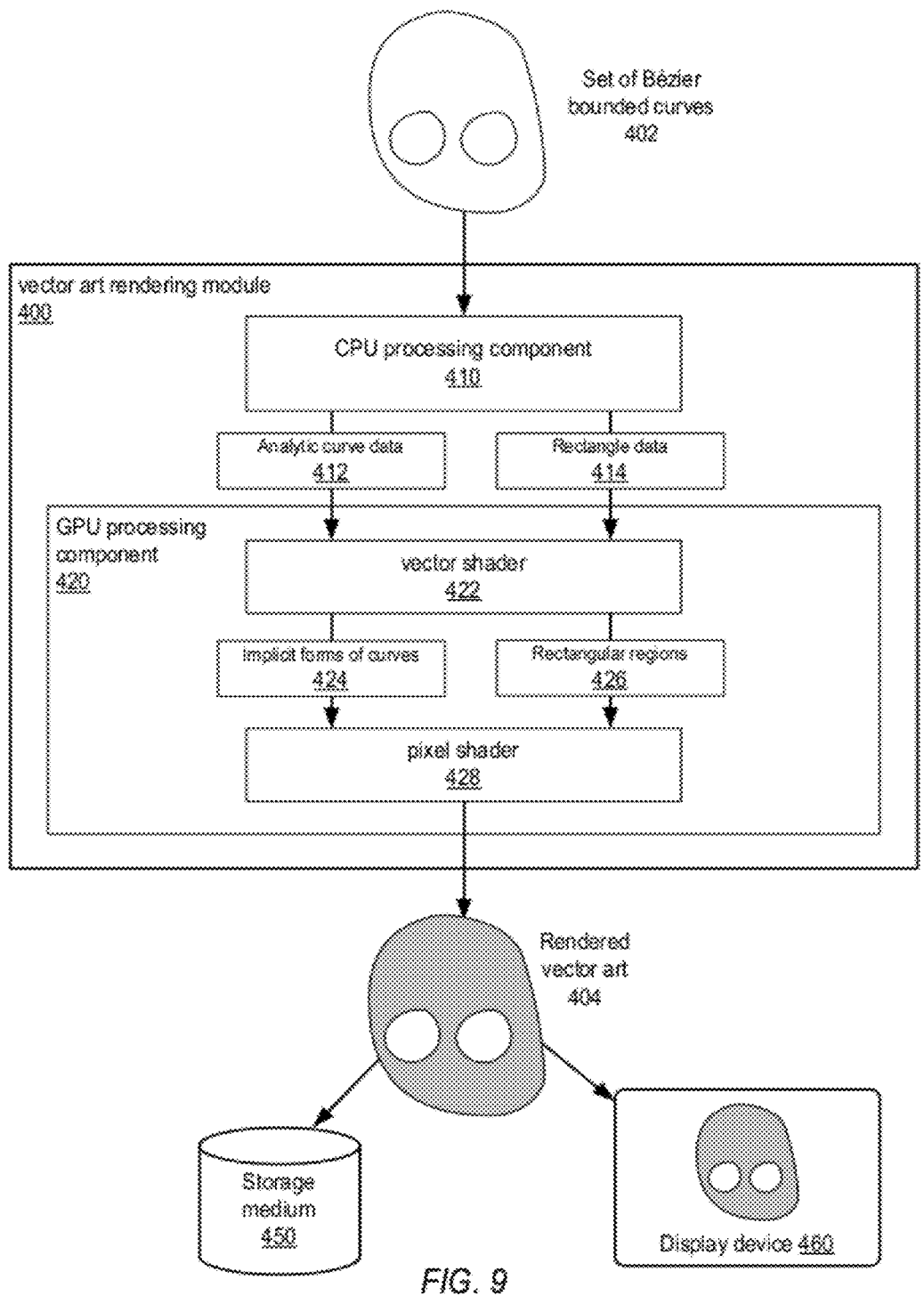
FIG. 9 illustrates a module that may implement methods for rendering vector art using graphics hardware, according to some embodiments.
Figure 10:
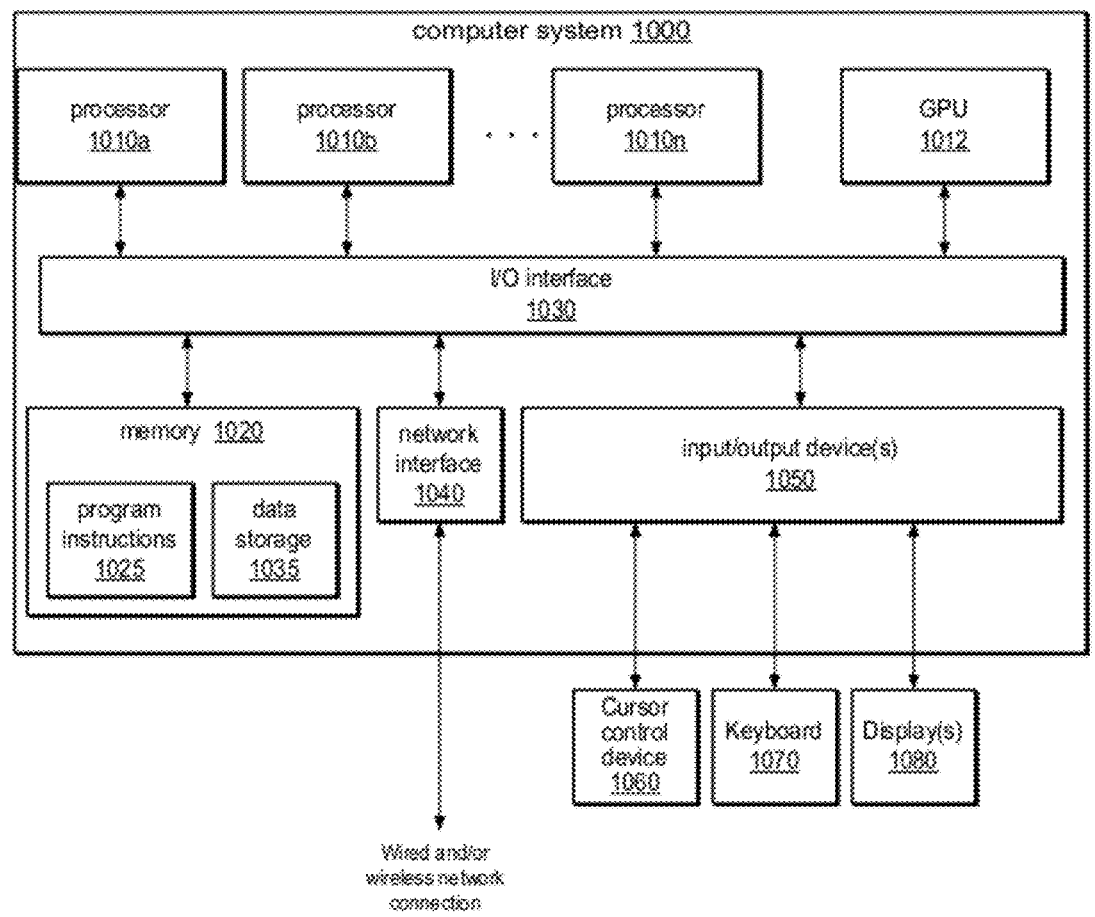
FIG. 10 illustrates an example computer system that may be used in embodiments.

Embodiments of methods for rendering vector art using graphics hardware as described herein may be implemented in or as a vector art rendering module. The vector art rendering module includes both CPU-side and GPU-side components or submodules. An example vector art rendering module is illustrated in FIG. 9. An example system on which embodiments of the vector art rendering module may be implemented is illustrated in FIG. 10.

Embodiments of the vector art rendering module maintain curves in their analytic form when transmitted to the GPU. On the GPU, the curve networks are evaluated to determine whether the pixel is inside or outside of the curve network. A discard operation is used to eliminate pixels that are outside of the bounded region. Pixels that are inside the bounded region are appropriately rendered. The technique used by the GPU in the discard operation may be based on a point-in-polygon algorithm that casts rays from points under test and counts the number of crossings before the rays exit the shape. In the non-degenerate case, an even number of crossings results in a point that is outside of the shape, as illustrated in FIG. 2.

Figure 2:
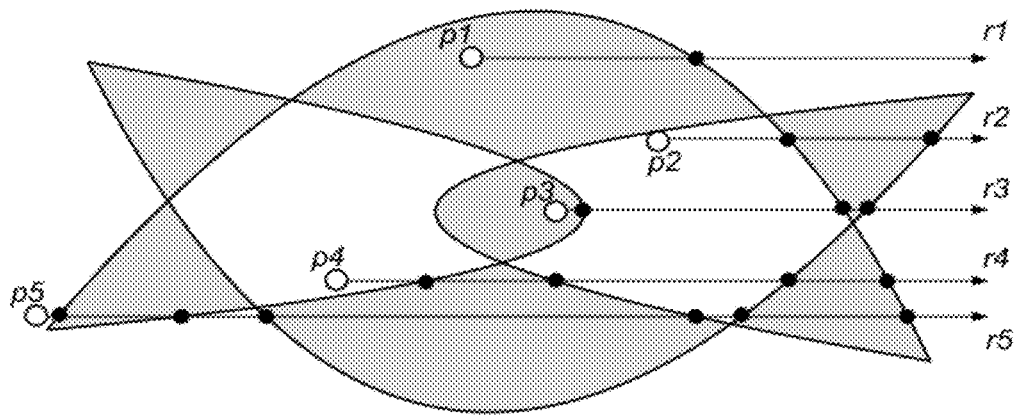
FIG. 2 illustrates that inside-outside tests for a complex Bézier bounded region may be made by casting rays horizontally and counting the number of crossings.

FIG. 2 illustrates that inside-outside tests for a complex Bézier bounded region may be made by casting rays horizontally and counting the number of crossings. In FIG. 2, the shaded areas represent the fill region that is inside the shape bounded by the curves; the white regions are outside the shape bounded by the curves. The white circles represent points p1, p2, p3, p4 and p5 being tested. The lines r1, r2, r3, r4 and r5 represent rays cast horizontally from left to right from the points by the pixel shader on the GPU. The black dots represent intersections of the rays with the curves that bound the fill region. Any point interior to (inside) the fill region will have an odd number of intersections, while any point exterior to (outside) the fill region will have an even number of intersections. In this example, ray r1 cast from test point p1 has one intersection, and is inside the fill region; ray r2 cast from test point p2 has two intersections, and is outside the fill region; ray r3 cast from test point p3 has three intersections, and is inside the fill region; ray r4 cast from test point p4 has four intersections, and is outside the fill region; and ray r5 cast from test point p5 has six intersections, and is outside the fill region.

While FIG. 2 shows rays being cast horizontally on the x axis, in a positive direction from left to right, note that the direction the rays are cast is arbitrary; rays may cast horizontally, from right to left, or vertically, from top to bottom or from bottom to top, to produce similar results.

For complex artwork with a large numbers of curves, the ray casting operation described above may result in the need to test against a virtually unbounded set of curves in the pixel shader. As described below, embodiments of the vector art rendering module as described herein may thus implement a method to bound the number of curves needed for such an inside-outside test, thus avoiding looping and branching in the pixel shader component on the GPU. The method for bounding the number of curves needed for the inside-outside test may be performed on the CPU side. However, this method is less CPU-intensive than the triangulation methods used in conventional vector art rendering techniques.

Figure 3:
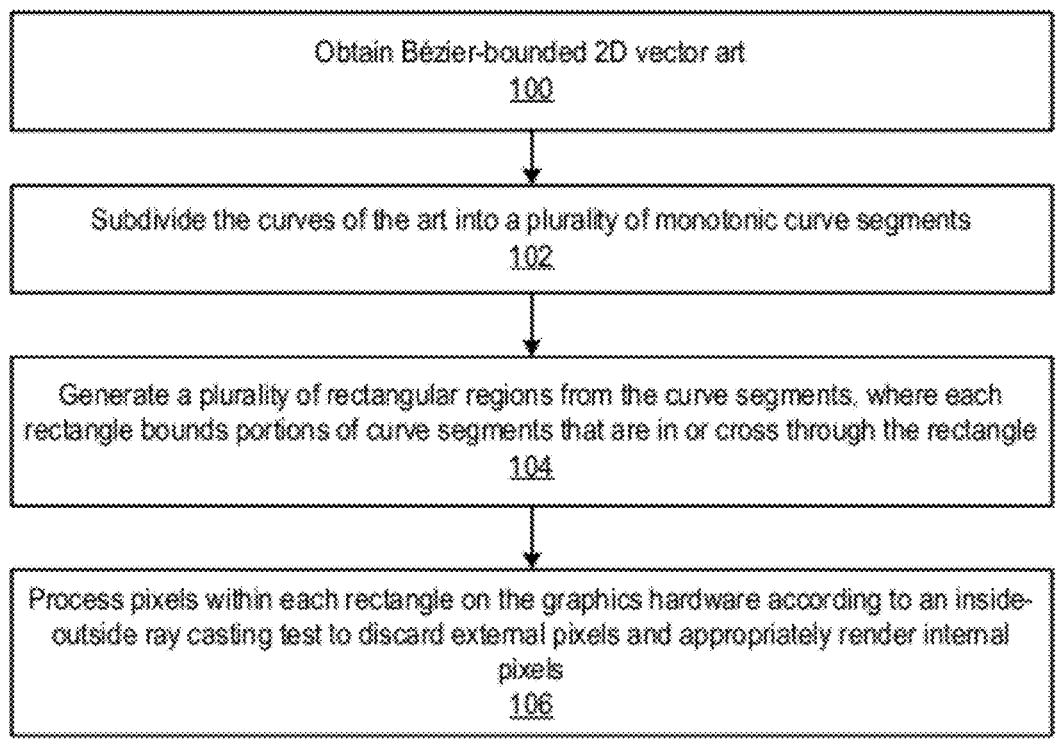
FIG. 3 is a high-level flowchart of a method for rendering vector art using graphics hardware, according to some embodiments.
Figure 4A:
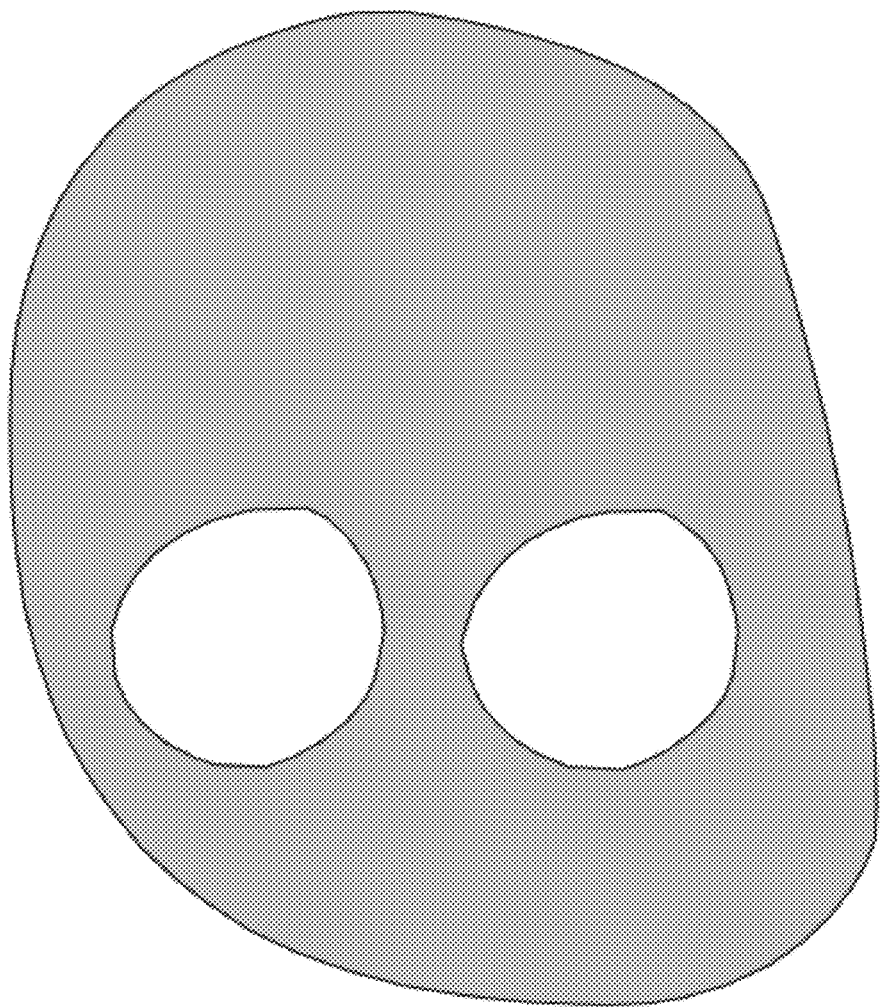
FIG. 4A shows an example of Bézier-bounded 2D vector art.
Figure 4B:
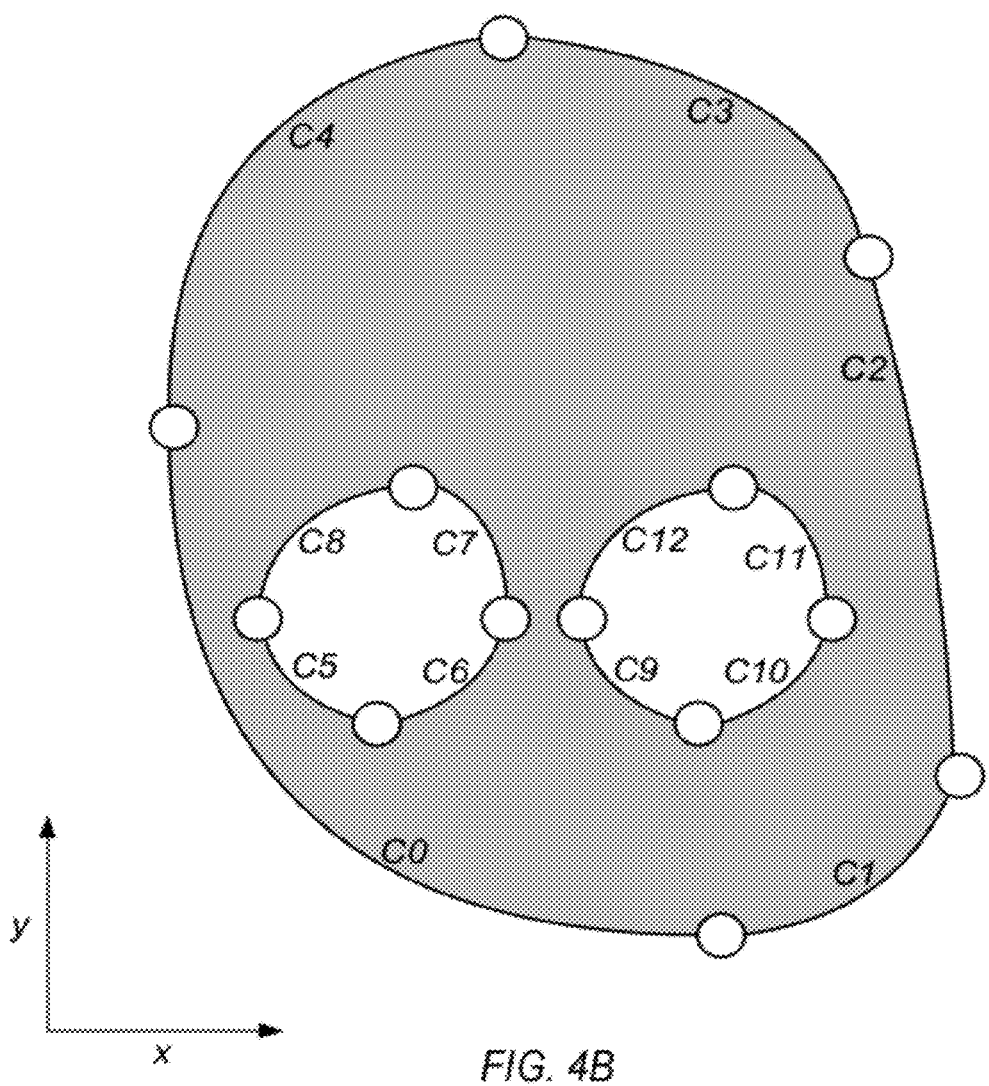
FIG. 4B shows an example subdivision of the curves in the vector art of FIG. 4A into y-monotone curve segments according to some embodiments.

FIG. 3 is a high-level flowchart of a method for rendering vector art using graphics hardware, according to some embodiments. As indicated at 100, an example of Bézier-bounded 2D vector art to be rendered may be obtained. As indicated at 102, the curves in the vector art may be subdivided into a plurality of monotonic curve segments. In some embodiments of a vector art rendering module, the curves in a curve network of an example Bézier-bounded 2D vector art are subdivided into a plurality of y-monotone curve segments. The curve segments are monotonic in y; that is, each curve segment has only a single crossing horizontally, in x. More generally, a monotonic curve segment in one of x and y planar directions has at most only a single crossing by a ray cast in the other planar direction. FIG. 4A shows an example of Bézier-bounded 2D vector art. FIG. 4B shows an example subdivision of the curves in the vector art of FIG. 4A into y-monotone curve segments C0 through C12 according to some embodiments. The white circles represent the end points of the curve segments. The end points may be referred to as events; each curve segment has a start event and an end event.

Figure 4C:
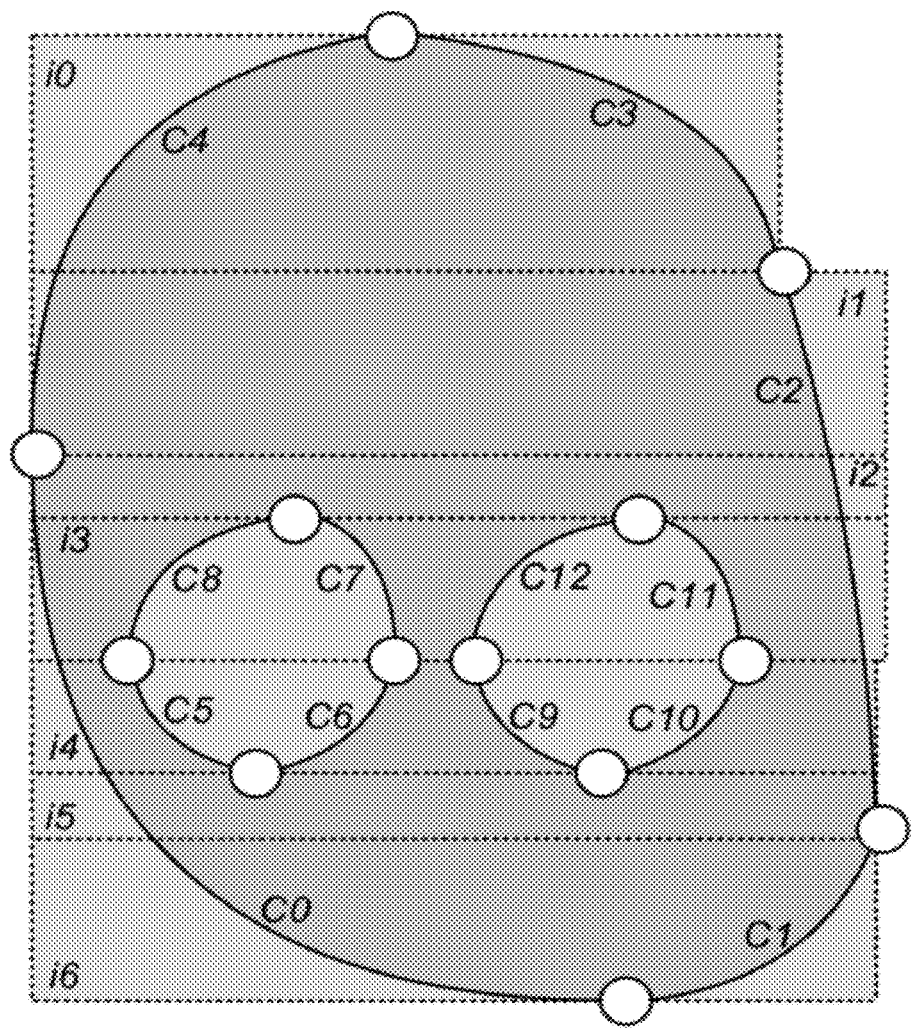
FIG. 4C illustrates a plurality of intervals for the curve segments illustrated in FIG. 4B according to some embodiments.

As indicated at 104, a plurality of rectangular regions, referred to simply as rectangles, may be generated from the curve segments. In some embodiments, the start and end events of the curve segments are sorted in y to form a plurality of intervals. Each interval may be represented as a rectangle that bounds the portions of the curve segments that are in or cross through the interval. FIG. 4C illustrates a plurality of intervals i0 through i6 for the curve segments illustrated in FIG. 4B according to some embodiments.

Figures 4D, 5:
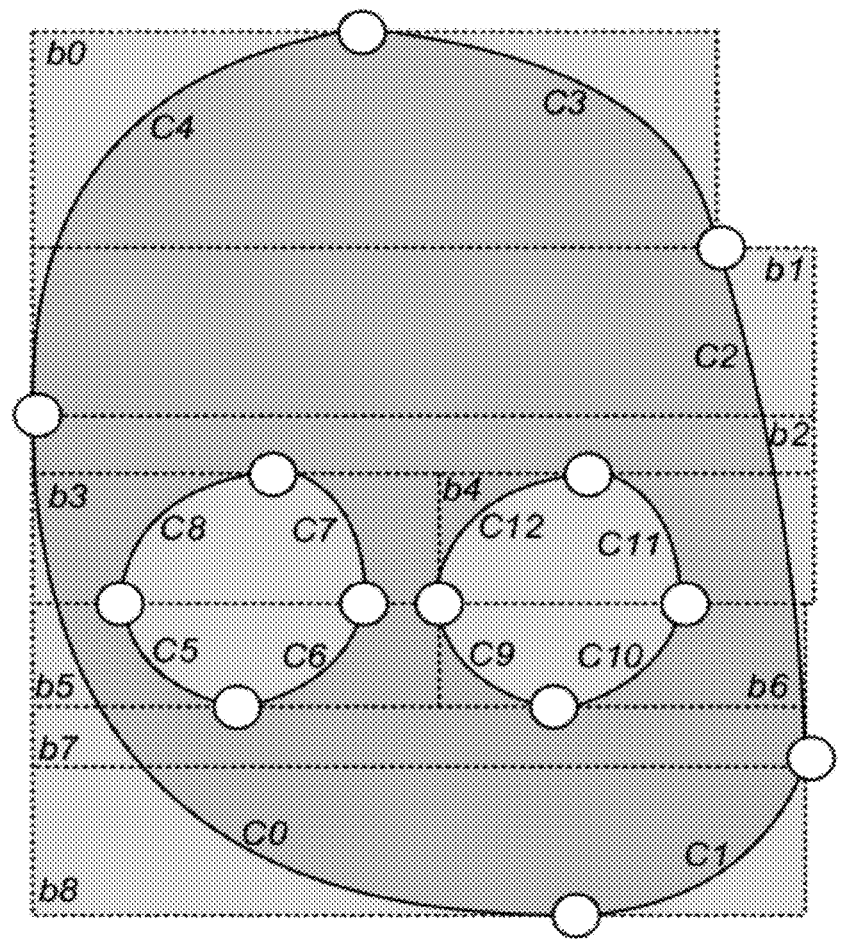
FIG. 4D illustrates a subdivision of the intervals illustrated in FIG. 4C into subintervals represented by rectangles according to some embodiments.
FIG. 5 shows a list of the rectangles shown in FIG. 4D according to some embodiments.

GPUs are generally able to perform at least some parallel processing. For example, pixel shaders may be able to process R, G, B and Alpha channels in parallel. Embodiments may take advantage of the parallel processing capabilities of GPUs to process multiple curves in parallel in the pixel shader. After generating the intervals as illustrated in FIG. 4C, further subdivision may be applied on the CPU to any interval that includes more than n curves, where n is the maximum number of curves that can be processed in parallel in the pixel shader. In some embodiments, n=4. In some embodiments, this subdivision may be applied in x. FIG. 4D illustrates a subdivision of the intervals i0 through i6 illustrated in FIG. 4C into subintervals represented by rectangles b0 through b8 according to some embodiments. In FIG. 4C, interval i3 included, or was crossed by, a total of six curve segments (C0, C8, C7, C12, C11, and C2). Assuming n=4, interval i3 includes more than the maximum number of curves. In FIG. 4D, interval i3 has been subdivided into two subintervals: rectangle b3, which includes or is crossed by curves C0, C8, and C7, and rectangle b4, which includes or is crossed by curves C12, C11, and C2. FIG. 5 shows a list of the rectangles shown in FIG. 4D according to some embodiments. For each rectangle, the respective curve segments that are included in or that cross the rectangle are listed.

While the above discussion of elements 100 through 104 assumes that the curves of the vector art are subdivided into a plurality of y-monotone curve segments, and the method proceeds from there, the choice of direction is arbitrary. Embodiments may instead subdivide the curves into x-monotone curve segments, and proceed with the above processing appropriately.

As indicated at 106, pixels within each rectangle may be processed on the graphics hardware according to an inside-outside ray casting test to discard external pixels and appropriately render internal pixels. After the above method to bound the number of curves is performed on the CPU, GPU rendering may be performed on the resultant rectangles. Each interval or sub-interval is directly rendered in the GPU. The analytic curve data representing the set of monotonic curves as illustrated in FIG. 4B may be transferred to the graphics hardware, for example as an array of curve control points. In practice, this may be done as soon as the curves have been monotonized. For each rectangle, data representing the bounds of the rectangle and referencing the curve segments included in the rectangle is sent to the graphics hardware. On the graphics hardware, when processing a rectangle, a vertex shader coalesces the respective curves to produce the implicit forms of the respective curves for the rectangle and forwards the implicit forms of the curves to the pixel shader. For each rectangle, the pixel shader applies an inside-outside test using ray casting at each pixel within the rectangle and the implicit forms of the curves within the rectangle to discard fragments that lie outside of the bounded curve network, and appropriately renders the pixels that lie inside of the bounded curve network. This processing may be done on the pixel shader in parallel, with up to n curves being processed in parallel. A rectangle effectively clips the bounds of the inside-outside testing so that points above or below the curves in the rectangle are not unnecessarily tested against the curves within the rectangle.

Some embodiments may employ modified forms of conventional implicit equations to enable inside-outside testing across multiple curves to be performed, as described below.

Curve Implicitization and Point-in-Polygon Testing

A quadratic Bézier curve can be defined as follows:

$$C(t)=At^2+Bt+C \quad (1)$$

with:

$$A=P_2-2P_1+P_0$$

$$B=2(P_1-P_0)$$

$$C=P_0 \quad (2)$$

where $P_0$ and $P_2$ are the start and end control points (in x and y) through which the curve passes, and $P_1$ is the control point. The parameter $t\in[0,1]$ can be used to sample the curve between its two end points.

In computational geometry, the problem of testing whether a point lies inside a bounded region may be referred to as point-in-polygon testing. One approach to point-in-polygon testing is based on ray casting (also known at the crossing number or even-odd rule algorithm). The even-odd rule algorithm may implemented in vector-based graphic software, and may be used to determine how a graphical shape with more than one closed outline will be filled. Given a point in space to be queried, an infinite ray may be cast, and it can be shown in the non-degenerate cases that the number of edges that the ray crosses is sufficient for determining whether the point lies inside or outside of the bounded region, as shown in FIG. 2. An odd number of crossings classifies points as inside the shape, and an even number as outside the shape. This test works regardless of whether the shape in question is complex (with self intersections) or concave.

For a Bézier bounded shape, and a point $P\in\Re^2$ in question, a method may traverse the list of curves and test the number of times a particular ray originating at P crosses the curves. While the choice of ray-direction is arbitrary, this discussion assumes that the rays are cast in the positive x direction along horizontal scanlines. To solve for the intersection points along a scanline $P_y$, Equation 1 can be set to y, and solved for t. This yields the following expression:

$$T(y) = \pm \frac{\sqrt{(P_2 - 2P_1 + P_0)y - P_0P_2 + P_1^2} - P_1 + P_0}{P_2 - 2P_1 + P_0} \quad (3)$$

The quadratic nature of the Bézier curve yields two potentially real solutions, since a ray can cross such a curve in as many as two places. By plugging any real $T(P_y)\in[0,1]$ values back into Equation 1, the locations in $x_i$ along the scanline that intersect the curve may be obtained. To compute the number of crossings for a point P only requires checking whether the $x_i$ scanline intersection locations are greater than $P_x$.

Using Equations 1 and 3, an implicit function may be formulated as follows:

$$g(x,y)=C(T(y))-x \quad (4)$$

The sign of evaluating G at coordinate x and y indicates whether a ray fired in the positive x direction intersects the curve. However, the cost of evaluating G for every pixel on the screen in question is expensive. For this reason, embodiments may use alternative implicit forms as described below.

Methods exist for converting parametric curves into implicit forms. Such an implicit is a function h(x,y) that evaluates to zero for any point that lies on the curve. The function will be positive or negative for any points lying away from the curve, and varies depending on which side of the curve the points lie. This provides an efficient and convenient method for testing which side of the curve a point lies, and has compact GPU implementations as shown by Loop and Blinn.

For a point x and y, it is known that the following two implicit formulas must simultaneously be satisfied:

$$(A_x-x)+B_x t+C_x t^2=0$$

$$(A_y-y)+B_y t+C_y t^2=0 \tag{5}$$

For any two polynomials:

$$f(x)=a_1^2+b_1 x+c_1$$

$$g(x)=a_1 x^2+b_1 x+c_1$$

the observation that, if f(x) and g(x) have a common root at x, then the equation:

$$f(x)g(y)-f(y)g(x)=0$$

will be satisfied for any value of y may be used. The expression has (x−y) as a factor since the equation is always satisfied by x=y. By evaluating:

$$f(x)g(y)-f(y)g(x)=(x-y)$$

the following is produced:

$$\begin{bmatrix} (a_0 b_0 - a_1 b_1) & (a_0 c_1 - a_1 c_0) \\ (a_0 c_1 - a_1 c_0) & (b_0 c_1 - b_1 c_0) \end{bmatrix} \begin{bmatrix} x \\ 1 \end{bmatrix} = 0 \tag{6}$$

For a square matrix system with n unknowns, a non-trivial solution exists only if the determinant of the matrix vanishes. Thus, the determinant of the matrix in Equation 6 forms the desired implicit function. By plugging into the implicit equation, the constant terms for a given curve may be collected:

$$E=P_1-P_0$$

$$G_0=P_0-2P_1+P_2$$

$$G_1=E2(G_{0x}E_y-G_{0y}E_x)$$

$$G_2=P_0 \tag{7}$$

The implicit formula h(x,y) may now be given by:

$$h(x,y)=r_0-r_1^2 \tag{8}$$

where $r_0$ and $r_1$ may be computed as follows:

$$T_0=G_2-P$$

$$r_0=G_{0x}*T_{0y}-G_{0y}*T_{0x};$$

$$r_1=G_{1x}*T_{0y}-G_{1y}*T_{0x}; \tag{9}$$

The terms $r_0$ and $r_1$ vary linearly and thus can be sent down the graphics pipeline as interpolated vertex attributes. Only Equation 8 needs to be evaluated in the pixel shader, making the implicit test fast to evaluate.

The implicit formula given in Equation 8 is valid for all of $\Re^2$, however, parametric curves are defined over a range of t values typically between 0 and 1. Loop and Blinn bound each curve with a triangle cage made up of the curve's three control vertices. This ensures that the implicit formula is never evaluated outside of the valid t range for a particular curve. However, this may pose a problem when multiple curves overlap, since only a single curve is tested at a time by Loop and Blinn's method. To resolve this problem, Loop and Blinn apply subdivision to ensure that no other curve is contained within another curve's control cage. However, for regions of high curvature, and for narrow regions bounded by two curves, this can lead to a significant amount of subdivision.

Embodiments of a vector art rendering module as described herein may avoid much of the CPU overhead of conventional methods, and may allow multiple curves to be processed simultaneously using a ray casting point-in-polygon algorithm as described herein. Embodiments may employ an implicit form that efficiently answers the question as to which side of a curve a point lies with respect to a horizontal ray query. Embodiments may simplify the processing by monotonizing all of the curves in one planar direction (x or y) so that each curve has only a single crossing point for a scanline in the other planar direction. In the discussion, the curves are assumed to be monotonized in the y direction.

Curve Monotonization

Splitting a curve into monotone pieces is a relatively straightforward operation that at most doubles the number of curves in an input set. By setting the derivative of Expression 1 to zero, embodiments may solve for the parametric $t_s$ location for splitting the curve by taking the derivative of Equation 1.

$$t_s = -\frac{P_{1y} - P_{0y}}{P_{2y} - 2P_{1y} + P_{0y}} \tag{10}$$

Given the parametric location $t_s$, embodiments subdivide the curve into two curves. Each is guaranteed to have only a single crossing in x between the y bounds of its control points. A curve can be subdivided into two curves at a parametric location $t_s$ as follows:

$$P_a=P_0(1-t)+P_1 t$$

$$P_b=P_0(1-t)^2+P_1 2(1-t)t+P_2 t^2$$

$$P_c=P_1(1-t)+P_2 t \tag{11}$$

The new curve control points are given by ($P_0,P_a,P_b$) and ($P_b,P_c,P_2$) respectively.

Modified Implicit Form

Figure 6A:
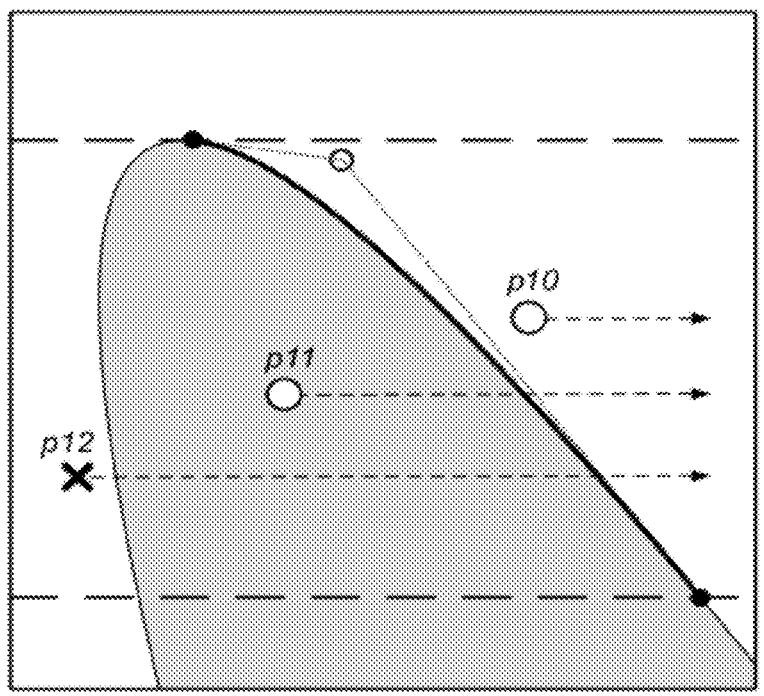
FIG. 6A illustrates that the conventional implicit formula results in a parabola that may result in errors in the implicit formula test.
Figure 6B:
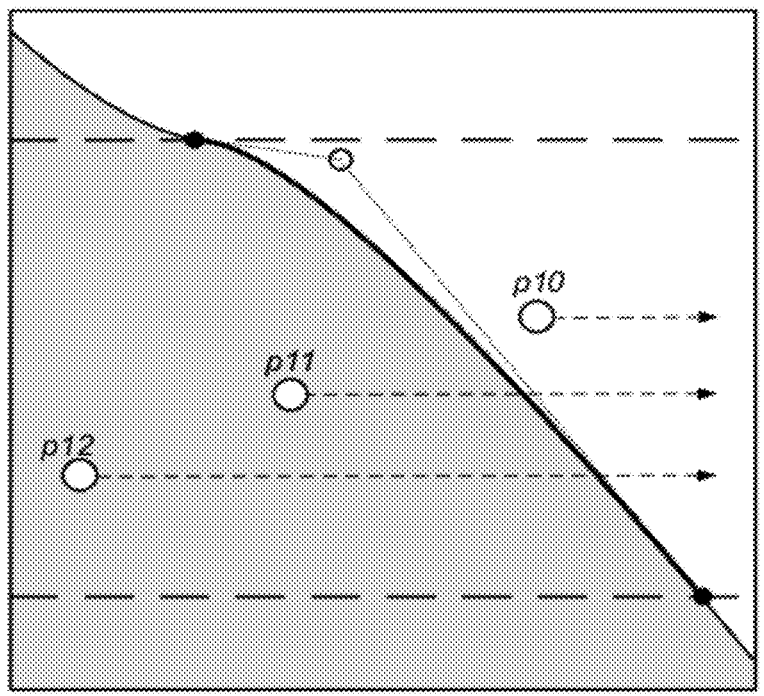
FIG. 6B illustrates mirroring the parabola around a control vertex to eliminate the errors illustrated in FIG. 6A, according to some embodiments.

When plotting the implicit formula given in Equation 8, the shape forms a parabola as shown in FIG. 6A. However, this form cannot be reliably used to count horizontal ray crossings by looking at the sign of the implicit formula test. As shown in FIG. 6A, the test for points p10 and p11 would produce correct results; a test at p10 would produce a positive result, correctly indicating that the ray does not intersect the curve, and a test at p11 would produce a negative result, correctly indicating that the ray intersects the curve. However, at point p12, the test would produce a positive result, indicating that the ray missed the curve, which is incorrect. To overcome this problem, embodiments may mirror or reflect the parabola around a control vertex at an end point of the curve, as shown in FIG. 6B, thus causing the curve to go up instead of curving down as in FIG. 6A. The given implicit representation then satisfies the desired ray query for any y monotone curve. Note that, in FIG. 6B, the ray casting test at p12 produces a negative result, which is correct.

The setup for this new implicit form may be given as follows:

$$\text{if}(P_0.y>P_2.y)\text{swap}(P_0,P_2);$$

$$G_0=P_0-2P_1+P_2$$

$$E_{02}=P_2-P_0$$

$$E_{01} = P_1 - P_0$$

$$E_{21} = P_1 - P_2$$

$$E = (|E_{01y}| > |E_{21y}|)?E_{21}:E_{01}$$

$$G_0 = (|E_{10y}| > |E_{21y}|)?(-G_0):(G_0)$$

$$G_1 = 2.0 * E * (G_{0x} * E_y - G_{0y} * E_x)$$

$$c = E_{02x} * E_{01y} - E_{02y} * E_{01x}$$

$$G_1 = (c<0)?(-G_1):(G_1)$$

$$G_2 = P_0 \quad (12)$$

The modified implicit formula $\hat{h}(x, y)$ is given by:

$$\hat{h}(x,y) = r_0 + |r_1|r_1 \quad (13)$$

where interpolants $r_0$ and $r_1$ are computed the same way as in equation 9.

Vector Art Processing Module Implementations

The following provides details on how this modified implicit form may be used with a ray-casting method using graphics hardware in implementations of a vector art processing module as described herein. Embodiments of a vector art processing method, implemented in a vector art processing module, may employ a combination of CPU side preparation of the data with GPU processing.

In the following discussion, an example implementation is assumed where the GPU can handle ray-intersection of at most n=4 curves in parallel. In practice, higher end GPUs may handle larger sets of curves. The larger the value of n, the lower the CPU load required to process the curves, but at the cost of additional instructions in the vertex shader and pixel shader. Also note that the example implementation assumes y-relative and x-relative operations. However, the orientation of the described operations is arbitrary.

CPU Side Preparation

Figure 7:
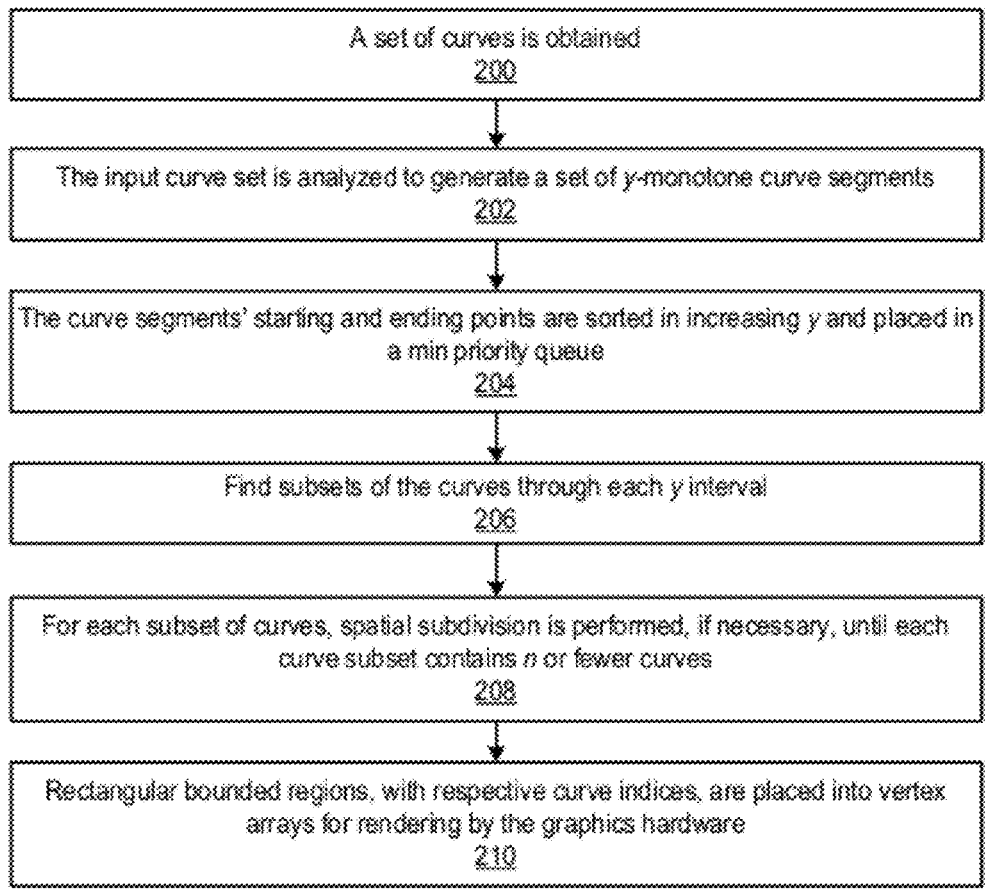
FIG. 7 is a flowchart of a method of CPU side preparation according to some embodiments.

FIG. 7 is a flowchart of a method of CPU side preparation according to some embodiments. As indicated at 200, a set of curves is obtained; for example a set of curves may be obtained from an example of Bézier-bounded 2D vector art to be rendered. As indicated at 202, the input curve set is analyzed to generate a set of y monotone curve segments. As indicated at 204, the curve segments' starting and ending points are sorted in increasing y and placed in a min priority queue E. As indicated at 206, subsets of the curves through each y interval are identified. As indicated at 208, for each subset of curves, spatial subdivision is performed, if necessary, until each curve subset contains n or fewer curves. An example of a sweep line algorithm that may be used in some embodiments to find the subsets of the curves is provided below. As indicated at 210, rectangular bounded regions that each bound a curve subset, with their respective curve indices, are placed into vertex arrays for rendering by the graphics hardware.

As indicated at 202 of FIG. 7, the input curve set is analyzed to generate a set of y monotone curve segments. CPU side preparation may start by scanning through the obtained list of curves and splitting all non-y monotone curves into curve segments. In some embodiments, non-monotone curves may be detected by checking whether a curve's control vertex $P_1$ is bounded in y between its starting and end vertices $P_0$ and $P_2$.

The analytic curve data representing the set of monotonic curves may be transferred to the graphics hardware, for example as an array of curve control points. In some embodiments, the CPU processing component may transfer an array of floating point data to the graphics hardware after converting the curves to the monotonic form; the array indicates the control points of the curves. Thus, every curve gets transferred once and only once to the graphics hardware.

However, in some cases, the CPU processing component may not be able to transfer all of the analytic curve data to the graphics hardware at one time. For example, some GPUs may not allow access to textures (which may be used as a constant memory) from a vertex shader. As another example, some GPUs may only have a limited amount of vertex shader constant memory to which curve data can be transferred. As another example, a large and/or complex piece of vector art may include so many curves that the analytic curve data may not fit into the vertex shader constant memory.

A solution that may be used in some embodiments to at least some situations in which the curve data cannot all be transferred to the graphics hardware is to split the art into sub-pieces on the CPU to reduce the curve count so that curve data for each sub-piece fits into vertex shader constant memory. This may, in pathological cases, take additional processing time, but would not cost much for typical shapes.

Another solution that may be used in some embodiments is to encode the curves that pass through a rectangular region into the rectangular region before passing the rectangular region to the graphics hardware for processing. Every rectangular region that is submitted to the graphics hardware may thus encode the curves that pass through it. This data can be sent down as vertex attributes of the rectangular region. In some embodiments, this may be done by redundantly encoding the curve values for each vertex of the rectangular region (i.e. each rectangular region vertex will have a copy of the curve data for the rectangular region). This approach increases the bandwidth to the graphics hardware; however, the approach may avoid some of the limitations of certain graphics hardware by not requiring the use of constant memory on the graphics hardware to transfer analytic curve data. This approach also allows for the implicit values to be computed on the CPU and transmitted to the graphics hardware instead of the curve data at each vertex. This may avoid redundant computation of curve data.

As indicated at 204 of FIG. 7, the curve segments' starting and ending points are sorted in increasing y and placed in a min priority queue E. For each curve, two events e are placed onto a min priority queue E. Each curve event includes either the min or the max y value of the curve, an indication of which curve the event belongs to, and a flag indicating whether the event is the start or end of a curve. As indicated at 206 of FIG. 7, subsets of the curves through each y interval are identified. Dividing curve lists up along the y intervals ensures that the implicit ray query test given in Equation 13 is not performed outside of a curve's range in y. As indicated at 208 of FIG. 7, for each subset of curves, spatial subdivision is performed, if necessary, until each curve subset contains n or fewer curves. Subdividing the intervals ensures that each interval passed to the graphics hardware includes no more than n curves, where n is the maximum number of curves that can be processed in parallel in the pixel shader. In some embodiments, n=4. An example sweep line algorithm in pseudocode form that may be used in some embodiments for finding lists of curves through each y interval and for performing spatial subdivision is given below.

```
Begin sweep line algorithm
    E                                    // Min priority queue of curve events
    while |E| do
        fIntervalStart = yLocation(front(E))
        while |E| do
            e ← pop(E)                   // Pop event e from list
            c ← getCurve(c)              // Get curve associated with e
            if isStartOfCurve(e) then
                A ← A ∪ c                // Add curve to active list
            else
                A ← A\c                  // Remove curve from active list
            end if
        end while
        if |A| then
            intervalEndY ← yLocation(front(E))
            ProcessCurveSet(A, intervalStartY, intervalEndY)
        end if
    end while
End sweep line algorithm
```

The sweep line algorithm pulls events off of the queue E and maintains an active list of curves through a bounded span in y. These sets are processed in the ProcessCurveSet( ) subroutine. This subroutine starts by computing the bounds of curves in x. Once this bounding box has been formed, a check is performed to see if the number of curves is n or less. If so, this rectangular region (along with the indices of the active curves) is added to the vertex array stored for the shape. The indices may be stored as texture coordinates for the rectangle.

In some cases, further refinement of the rectangular spaces may be required until there are n our fewer curves in each bounding box. In some embodiments, this may be performed by subdividing the rectangular regions in either x or y until there are n or fewer curves in each rectangle.

In embodiments, in the graphics hardware, even-odd parity ray casting testing is used to determine whether a point lies inside the bounded geometry. In an even-odd parity ray casting test, a given ray is tested against all curves until the bounds of the shape have been reached. In embodiments where rays are cast in a positive x direction, a subdivision in y does not impact the query since rays are fired in the positive x direction; however, a division in x does. Thus, for some rectangles, for example b3 and b5 of FIG. 4D, an even-odd parity ray casting test for a point in the rectangle may give the wrong result. For example, a ray cast to test a point in b3 would also intersect the curves in b4.

To handle the above situation, some embodiments may employ the following method that modifies the even-odd parity test. An observation is made that curves may be processed through any local subregion of space if the number of curve intersections to the right of the subregion is constant. By determining the constant number of intersections to the right of the rectangular region, the even-odd parity test may be modified to account for the curves to the right of the subregion that will be trivially intersected by any ray emanating from within the subregion. In some embodiments, the rectangular regions may be subdivided in x from right to left. During each subdivision, the parity of the number of curves entirely to the right of each subblock (rectangular region) is tracked. This results in an overall parity for each subregion.

When passing a rectangular region to the vertex shader, the parity of the rectangular region may be indicated by negating the transmitted curve indices. Based on the parity, the vertex shader flips the sign of $r_0$ and $r_1$ for the first curve in the set before forwarding the data to the pixel shader. This effectively switches the even-odd counting rule for the subregion.

As indicated at 210, rectangular bounded regions that each bound a curve subset, with their respective curve indices, are placed into vertex arrays for rendering by the graphics hardware. Once the list of rectangular regions (with their contained curved indices) has been built, this data may be cached into a vertex array for the shape. Note that this information does not need to be recomputed unless the shape undergoes a non-rigid transformation or topology change. During rendering, the vertex arrays, along with the curve data, is submitted to the GPU for rendering with the shaders enabled as described in the following discussion.

GPU Side Processing

In some embodiments, GPU processing may include two components: vertex shader processing and pixel shader processing. The following describes examples of vertex shader processing and pixel shader processing according to some embodiments.

Figure 8:
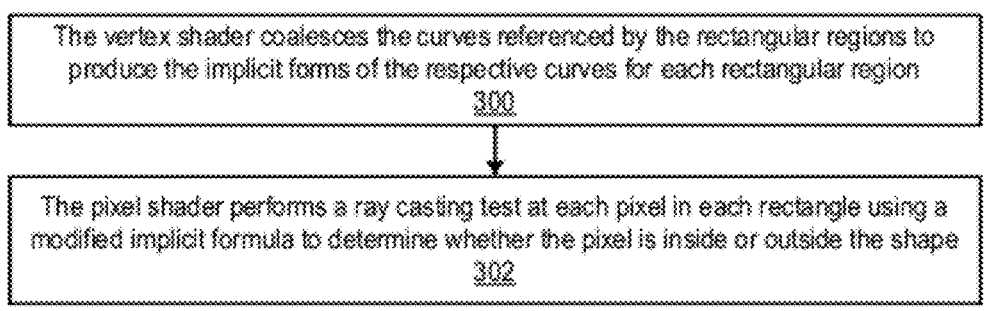
FIG. 8 is a high-level flowchart illustrating a method of GPU processing according to some embodiments.

FIG. 8 is a high-level flowchart illustrating a method of GPU processing according to some embodiments. As indicated at 300, the vertex shader coalesces the curves referenced by the rectangles to produce the implicit forms of the respective curves for each rectangle. In some embodiments, the vertex shader may have access to an array of floating point data that is transferred by the CPU processing component after converting the curves to the monotonic form; the array indicates the control points of the curves. Thus, every curve gets transferred once and only once to the graphics hardware. When the CPU processing component sends down a rectangle to be processed by the graphics hardware, the vertices of the rectangle and the indices of the curves in the rectangle are run through the vertex shader. The vertex shader gets relevant curve information for the rectangle from the array, and processes the curves to convert them to implicit forms. Some of the implicit values may be interpolated across the rectangle; different values are computed for the n curves relative to the four corners of the rectangle. Interpolation units in the graphics hardware may be used to smoothly interpolate the values through the interior of the rectangle. In equation 13, the values that are smoothly interpolated are r0 and r1, computed at the corners of the rectangle by coalescing the n curves. There are actually n r0 values and n r1 values, as the method is performing n-way processing. These values are then smoothly interpolated in the R, G, B and Alpha channels across the interior of the rectangle, and passed to the pixel shader.

As indicated at 302, the pixel shader performs a ray casting test at each pixel in each rectangle using a modified implicit formula to determine whether the pixel is inside or outside the shape. The pixel shader evaluates equation 13 given the interpolated r0 and r1 values. The pixel shader does this for every pixel location in the respective rectangle. When evaluating equation 13 for a given pixel, the pixel shader does it for all n curves in parallel. The method allows n curves to be processed in the pixel shader in parallel in each ray cast test. If there are fewer than n active curves in a rectangle, the method used insures that the value of the implicit evaluates to 1 for the inactive curve(s) so that inactive curves do not affect the answer.

Vertex Shader Processing

As indicated at 300 of FIG. 8, the vertex shader coalesces the curves referenced by the rectangles to produce the implicit forms of the respective curves for each rectangle. In some embodiments, the vertex shader coalesces the curves referenced by the primitives (i.e., the rectangles to be processed in the graphics hardware as determined by the CPU processing) and computes the interpolant values $r_0$ and $r_1$ for each curve for each vertex to produce the implicit forms of the respective curves for a respective rectangle. The curve data can either be stored in uniform vertex shader memory or in texture memory. The former has stricter limits on the size of shapes that can be rendered, while the latter requires GPUs capable of accessing textures in the vertex shader. In some embodiments, the curve data may be stored in its raw form, which requires the vertex shader to evaluate both Equations 12 and 9 for each vertex. In some embodiments, as an alternative, the values $G_0$, $G_1$, and $G_2$ may be pre-computed on the CPU and transmitted instead of the raw curve data. The latter approach may avoid redundant evaluation of curve data.

The vertex shader computes $r_0$ and $r_1$ for the four referenced curves, and packs the result in a four way SIMD (Single Instruction, Multiple Data) layout into interpolants $R_0$ and $R_1$ for processing in the pixel shader. SIMD is a technique that may be used to achieve data level parallelism. In some cases, not all subregions will contain n active curves. For any inactive curves, the method may set $r_0=0$ and $r_1=1$. These values are guaranteed not to change the result of the even-odd parity check done in the pixel shader.

As mentioned previously, in some cases, primitives may be submitted to the vertex shader with negative indices to denote a desired flip in parity for the even-odd test in the pixel shader. To handle such cases, the interpolant sign of the first curve (i.e. $R_0x$ and $R_1x$) in the curve set may be flipped in the vertex shader. This effectively switches the even-odd parity check in the pixel shader without incurring additional per-pixel cost.

Pixel Shader Processing

As indicated at 302 of FIG. 8, the pixel shader may perform a ray casting test at each pixel in each rectangle using a modified implicit formula to determine whether the pixel is inside or outside the shape. Example OpenGL Shading Language (GLSL) code for a pixel shader processing implementation for four curves (n=4) that may be used in some embodiments is provided below. The example code is not intended to be limiting:

```
varying vec4 R0,R1;
uniform vec4 color;
void main( ) {
  vec4 imp=R0+abs(R1)*R1; // modified implicit ĥ(x,y)
    =r_0+|r_1|r_1 (Eq. (13))
  imp.xy*=imp.zw; // Multiply the implicit results
  if((imp.x*imp.y)>=0.0)// test the parity
    discard; // discard pixel with positive or 0 parity
  gl_FragColor=color; // color pixel with negative parity
}
```

In this example, the (x, y, z, w) channels of the varying interpolants hold $r_0$ and $r_1$ values for the four curves respectively in a SIMD manner. The result of the implicit calculation is stored in imp and is positive if the ray hits the curve. Computing whether the number of intersections is even or odd can be accomplished in a number of ways. For example, the intersections may be summed and a modulus operation applied. However, multiplying the implicit results together and checking the resulting sign yields the same result. Multiplying the implicit results together and checking the resulting sign is equivalent to applying a sequence of exclusive or's (XORs), and is more efficient in graphics hardware than summing the intersections and applying a modulus operation.

Example Implementations

FIG. 9 illustrates an example vector art rendering module that may implement the vector art rendering methods as illustrated in FIGS. 2 through 7, according to some embodiments. FIG. 10 illustrates an example computer system on which embodiments of vector art rendering module 400 may be implemented. Vector art rendering module 400 may include a CPU processing component 410 and a GPU processing component 420. GPU processing component 420 may implement a vertex shader 422 and a pixel shader 428. Vector art rendering module 400 may receive a set of Bézier-bounded curves as input. See, for example, FIGS. 1, 2 and 4A. CPU processing component 410 subdivides the curves into a plurality of monotonic curve segments and generates a plurality of rectangular regions from the curve segments, with each rectangle referencing at most n curves. Each rectangle bounds portions of curve segments that are in or cross through the rectangle. CPU processing component 410 transfers the analytic curve data 412 representing the set of monotonic curves to the graphics hardware, for example as an array of curve control points. For each rectangle, data 414 representing the bounds of the rectangle and referencing the at most n curve segments included in the rectangle is sent to the graphics hardware. On the graphics hardware, when processing a rectangle, a vertex shader 422 coalesces the curves to produce the implicit forms of the respective curves for the rectangle and forwards the implicit forms of the curves to the pixel shader 428. For each rectangle, the pixel shader 428 applies an inside-outside test using ray casting at each pixel within the rectangle and the implicit forms of the curves within the rectangle to discard fragments that lie outside of the bounded curve network, and appropriately renders the pixels that lie inside of the bounded curve network. This processing may be done on the pixel shader 428 with n curves being processed in parallel. The output is rendered vector art 404. Rendered vector art 404 may, for example, be stored to a storage medium 450, such as system memory, a disk drive, DVD, CD, etc., and/or displayed to a display device 460. Analytic curve data 412 and rectangle data 414 may also be stored so that the data does not have to be recomputed for operations such as rotation, translation, and scaling. When a change is made to the vector artwork, if the content does not change, for example if the art is only being rotated, scaled, or translated, reprocessing is not required.

Ray Tracing 2D Vector Art on 3D Surfaces

A curved region of a 3D surface may have a mapping of how that surface can be flattened into 2D that allows textures or 2D artwork to be wrapped onto the surface of a 3D model. If the artwork being mapped is vector art, when a ray hits the surface of the 3D model, embodiments of the vector art rendering module may be used to perform a fast query to find out where the ray intersects the vector art and what color to apply for a point in the 3D surface. The vector art rendering module may be applied to generate the rectangles, monotonic curve segments, and so on described above. This information may be stored. When a ray hits the 3D surface, the ray may be mapped onto the 2D model to obtain its 2D location. The 2D location may be mapped to a particular rectangle generated by the vector art rendering module. Once the rectangle is determined, the implicitization and inside-outside test for the point at which the ray intersects the 2D surface may be performed on the GPU as described herein to determine if the point is inside or outside the vector art, and the point may then be rendered appropriately.

Example System

Embodiments of a vector art rendering module as described herein may be executed on one or more computer systems, which may interact with various other devices. One such computer system is illustrated by FIG. 10. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, display(s) 1080, and multitouch-enabled device(s) 1090. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

Computer system 1000 may include at least one graphics processing unit (GPU) 1012. A graphics processing unit or GPU 1012 may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). GPU components of a vector art rendering module as described herein, such as a vertex shader and a pixels shader, may be implemented by program instructions configured for execution on one of, or parallel execution on two or more of, such GPUs 1012. The GPU(s) may implement one or more application programmer interfaces (APIs) that permit programmers to invoke the functionality of the GPU(s) as described herein. Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a vector art rendering module, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 configured to implement embodiments of a vector art rendering module as described herein, and data storage 1035 comprising various data accessible by program instructions 1025. In one embodiment, program instructions 1025 may include software elements of embodiments of a vector art rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a vector art rendering module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   obtaining an input set of curves representing two-dimensional (2D) vector art to be rendered;
   subdividing the set of curves into a plurality of monotonic curve segments in one of x or y planar directions, wherein a monotonic curve segment in one of x or y planar directions has only a single crossing by a ray cast in the other planar direction;
   generating a plurality of rectangular regions from the plurality of monotonic curve segments, wherein each rectangular region includes or is crossed by no more than n of the curve segments, where n is a maximum number of curve segments that can be processed in parallel by a Graphics Processing Unit (GPU); and
   processing each pixel within each rectangular region on the GPU according to an inside-outside ray casting test to discard pixels that are external to the vector art and appropriately render pixels that are internal to the vector art, wherein, to process a given pixel within a given rectangular region on the GPU according to the inside-outside ray casting test, the cast ray is tested against n curve segments of the respective rectangular region in parallel on the GPU.

2. The computer-implemented method as recited in claim 1, wherein said generating a plurality of rectangular regions from the plurality of monotonic curve segments comprises:
   sorting the plurality of monotonic curve segments in one of x or y planar directions according to the curve segments' starting and ending points to form a plurality of intervals in the x or the y planar direction; and
   for each of the plurality of intervals that includes or is crossed by more than n of the curve segments, subdividing the interval in the other planar direction to generate a plurality of subintervals each including or crossed by no more than n of the curve segments.

3. The computer-implemented method as recited in claim 1, further comprising transferring analytic curve data representing the set of monotonic curves, data indicating each of the plurality of rectangular regions, and, for each rectangular region, data indicating the curve segments that are included in or cross the respective rectangular region to the GPU prior to said processing each pixel within each rectangular region on the GPU.

4. The computer-implemented method as recited in claim 1, wherein said processing each pixel within each rectangular region on the GPU according to an inside-outside ray casting test comprises:
   for each rectangular region, a vertex shader implemented on the GPU coalescing curve segments that cross or that are included in the respective rectangular region to produce implicit forms of the respective curve segments;
   for each pixel within each rectangular region, a pixel shader implemented on the GPU performing a ray casting test at the pixel using a modified implicit formula that evaluates the implicit forms of the respective curve segments in parallel to determine whether the pixel is internal to or external to the vector art.

5. The computer-implemented method as recited in claim 4, wherein the modified implicit formula is of the form $\hat{h}(x, y) = r_0 + |r_1|r_1$, where $r_0$ and $r_1$ represent interpolants for the respective curve segments generated by the vector shader in said coalescing the respective curve segments.

6. The computer-implemented method as recited in claim 5, wherein a given rectangular region is crossed by or includes fewer than n curve segments, the method further comprising setting $r_0$ and $r_1$ for a curve segment that is inactive in the given rectangular region so that the inactive curve segment does not affect the results of the ray casting test using the modified implicit formula.

7. The computer-implemented method as recited in claim 4, wherein the pixel shader multiplies results of the modified implicit formula and tests parity of results of said multiplication to determine whether the pixel is internal to or external to the vector art.

8. The computer-implemented method as recited in claim 4, further comprising, for a given rectangular region, the vertex shader specifying a parity for the rectangular region to account for curve segments outside the given rectangular region that will be intersected by rays cast from pixels inside the given rectangular region when performing the ray casting test at the pixels using the modified implicit formula.

9. A system, comprising:
   at least one processor;
   a graphics processing unit (GPU); and
   a memory comprising program instructions, wherein the program instructions are executable by the at least one processor to:
      obtain an input set of curves representing two-dimensional (2D) vector art to be rendered;
      subdivide the set of curves into a plurality of monotonic curve segments in one of x or y planar directions, wherein a monotonic curve segment in one of x or y planar directions has only a single crossing by a ray cast in the other planar direction; and
      generate a plurality of rectangular regions from the plurality of monotonic curve segments, wherein each rectangular region includes or is crossed by no more than n of the curve segments, where n is a maximum number of curve segments that can be processed in parallel by the GPU;
   wherein the GPU is configured to process each pixel within each rectangular region according to an inside-outside ray casting test to discard pixels that are external to the vector art and appropriately render pixels that are internal to the vector art, wherein, to process a given pixel within a given rectangular region according to the inside-outside ray casting test, the cast ray is tested against n curve segments of the respective rectangular region in parallel on the GPU.

10. The system as recited in claim 9, wherein, to generate a plurality of rectangular regions from the plurality of monotonic curve segments, the program instructions are executable by the at least one processor to:
   sort the plurality of monotonic curve segments in one of x or y planar directions according to the curve segments' starting and ending points to form a plurality of intervals in the x or the y planar direction; and
   for each of the plurality of intervals that includes or is crossed by more than n of the curve segments, subdivide the interval in the other planar direction to generate a plurality of subintervals each including or crossed by no more than n of the curve segments.

11. The system as recited in claim 9, wherein the program instructions are executable by the at least one processor to transfer analytic curve data representing the set of monotonic curves, data indicating each of the plurality of rectangular regions, and, for each rectangular region, data indicating the curve segments that are included in or cross the respective rectangular region to the GPU prior to said processing each pixel within each rectangular region on the GPU.

12. The system as recited in claim 9, wherein, to process each pixel within each rectangular region according to an inside-outside ray casting test, the GPU is configured to:
   for each rectangular region, coalesce curve segments that cross or that are included in the respective rectangular region to produce implicit forms of the respective curve segments;
   for each pixel within each rectangular region, perform a ray casting test at the pixel using a modified implicit formula that evaluates the implicit forms of the respective curve segments in parallel to determine whether the pixel is internal to or external to the vector art.

13. The system as recited in claim 12, wherein said coalescing is performed by a vertex shader implemented on the GPU, and wherein said performing ray casting testing is performed by a pixel shader implemented on the GPU.

14. The system as recited in claim 12, wherein the modified implicit formula is of the form $\hat{h}(x,y)=r_0+|r_1|r_1$, where $r_0$ and $r_1$ represent interpolants for the respective curve segments generated in said coalescing the respective curve segments, and wherein the GPU multiplies results of the modified implicit formula and tests parity of results of said multiplication to determine whether the pixel is internal to or external to the vector art.

15. The system as recited in claim 12, wherein the GPU is further configured to, for a given rectangular region, specify a parity for the rectangular region to account for curve segments outside the given rectangular region that will be intersected by rays cast from pixels inside the given rectangular region when performing the ray casting test at the pixels using the modified implicit formula.

16. A non-transitory computer-readable storage medium storing program instructions, wherein the program instructions are computer-executable to implement:
   obtaining an input set of curves representing two-dimensional (2D) vector art to be rendered;
   subdividing the set of curves into a plurality of monotonic curve segments in one of x or y planar directions, wherein a monotonic curve segment in one of x or y planar directions has only a single crossing by a ray cast in the other planar direction;
   generating a plurality of rectangular regions from the plurality of monotonic curve segments, wherein each rectangular region includes or is crossed by no more than n of the curve segments, where n is a maximum number of curve segments that can be processed in parallel by a Graphics Processing Unit (GPU); and
   processing each pixel within each rectangular region on the GPU according to an inside-outside ray casting test to discard pixels that are external to the vector art and appropriately render pixels that are internal to the vector art, wherein, to process a given pixel within a given rectangular region on the GPU according to the inside-outside ray casting test, the cast ray is tested against n curve segments of the respective rectangular region in parallel on the GPU.

17. The non-transitory computer-readable storage medium as recited in claim 16, wherein, in said generating a plurality of rectangular regions from the plurality of monotonic curve segments, the program instructions are computer-executable to implement:
   sorting the plurality of monotonic curve segments in one of x or y planar directions according to the curve segments' starting and ending points to form a plurality of intervals in the x or the y planar direction; and for each of the plurality of intervals that includes or is crossed by more than n of the curve segments, subdividing the interval in the other planar direction to generate a plurality of subintervals each including or crossed by no more than n of the curve segments.

18. The non-transitory computer-readable storage medium as recited in claim 16, wherein the program instructions are computer-executable to implement transferring analytic curve data representing the set of monotonic curves, data indicating each of the plurality of rectangular regions, and, for each rectangular region, data indicating the curve segments that are included in or cross the respective rectangular region to the GPU prior to said processing each pixel within each rectangular region on the GPU.

19. The non-transitory computer-readable storage medium as recited in claim 16, wherein, in said processing each pixel within each rectangular region on the GPU according to an inside-outside ray casting text, the program instructions are computer-executable to implement:

for each rectangular region, a vertex shader implemented on the GPU coalescing curve segments that cross or that are included in the respective rectangular region to produce implicit forms of the respective curve segments;

for each pixel within each rectangular region, a pixel shader implemented on the GPU performing a ray casting test at the pixel using a modified implicit formula that evaluates the implicit forms of the respective curve segments in parallel to determine whether the pixel is internal to or external to the vector art.

20. The non-transitory computer-readable storage medium as recited in claim 19, wherein the modified implicit formula is of the form $\hat{h}(x,y)=r_0+|r_1|r_1$, where $r_0$ and $r_1$ represent interpolants for the respective curve segments generated by the vector shader in said coalescing the respective curve segments, and wherein the pixel shader multiplies results of the modified implicit formula and tests parity of results of said multiplication to determine whether the pixel is internal to or external to the vector art.

* * * * *